(12) United States Patent
Osborne

(10) Patent No.: US 12,186,998 B2
(45) Date of Patent: Jan. 7, 2025

(54) STRINGER PLUG

(71) Applicant: SPIRIT AEROSYSTEMS, INC., Wichita, KS (US)

(72) Inventor: George M. Osborne, Wichita, KS (US)

(*) Notice: Subject to any disclaimer, the term of this patent is extended or adjusted under 35 U.S.C. 154(b) by 1232 days.

(21) Appl. No.: 16/178,916

(22) Filed: Nov. 2, 2018

(65) Prior Publication Data
US 2020/0140054 A1 May 7, 2020

(51) Int. Cl.
*B29C 70/86* (2006.01)
*B29C 70/34* (2006.01)
*B29C 70/48* (2006.01)
*B29C 70/68* (2006.01)
*B29C 70/84* (2006.01)
*B64C 1/06* (2006.01)
*B64C 3/18* (2006.01)
*B64F 5/10* (2017.01)
*B29K 105/08* (2006.01)
*B29K 307/04* (2006.01)
*B29K 707/04* (2006.01)
*B29L 31/30* (2006.01)
*B64C 1/00* (2006.01)

(52) U.S. Cl.
CPC ............ *B29C 70/86* (2013.01); *B29C 70/342* (2013.01); *B29C 70/48* (2013.01); *B29C 70/682* (2013.01); *B29C 70/84* (2013.01); *B64C 1/064* (2013.01); *B64C 3/182* (2013.01); *B64F 5/10* (2017.01); *B29K 2105/0872* (2013.01); *B29K 2307/04* (2013.01); *B29K 2707/04* (2013.01); *B29K 2821/00* (2013.01); *B29L 2031/3076* (2013.01); *B29L 2031/3082* (2013.01); *B29L 2031/3085* (2013.01); *B64C 2001/0054* (2013.01); *B64C 2001/0072* (2013.01)

(58) Field of Classification Search
CPC ...................................................... B64C 3/182
See application file for complete search history.

(56) References Cited

U.S. PATENT DOCUMENTS

| | | | |
|---|---|---|---|
| 10,023,321 B1 | 7/2018 | Oyzerskiy | |
| 10,494,893 B2 * | 12/2019 | Tse | B29C 53/822 |
| 10,549,492 B2 * | 2/2020 | Cruzado Parla | B29C 70/446 |

* cited by examiner

*Primary Examiner* — Benjamin A Schiffman
(74) *Attorney, Agent, or Firm* — Stinson LLP

(57) ABSTRACT

A plugged stringer on a surface of a part, and a method and assembly for production of the plugged stringer. The plug has opposite first and second axial end faces. The plug also has a radially outer margin defined by a radially outer bottom face, radially outer first and second opposite side faces, and a radially outer top face. The plugged stringer also includes a covering overlaying the radially outer top face and the first and second opposite side faces of the plug and extending away from the plug along an axis to form a stringer having first and second segments delineated by the plug. The radially outer margin of the plug is at least partly covered by an adhesive. The radially outer bottom face is adhered to the surface of the part, and the covering is adhered to the radially outer first and second opposite side faces and the radially outer top face. The first and second segments of the stringer respectively define first and second fluid passages separated by the plug. The first fluid passage is fluidly isolated from the second fluid passage by the plug.

10 Claims, 7 Drawing Sheets

STRINGER PLUG

BACKGROUND

A stringer is a stiffening member of a vehicle, such as an aircraft, that strengthens skin of the vehicle against buckling under compression or shear loads. Exemplary stringers may extend along and be joined to an inner surface of aircraft skin of a wing or fuselage to reduce bending. More particularly, aerodynamic loads acting on the skin may be transferred to frames, formers, ribs and/or spars or the like via the stringers.

Stringers may comprise strong, stiff and preferably lightweight covering materials such as alloys of aluminum, steel and titanium, and may be joined to the skin using fasteners, adhesives or the like. Stringers may have any of various cross-sectional shapes, including HAT stringer, I-stringer, J-stringer, Y-stringer and/or Z-stringer shapes.

An advanced form of stringer may be a composite stringer bonded or co-cured to an aircraft skin to provide structural integrity to the skin while cutting down on the added weight of fasteners and the like. For example, rather than fabricating the stringer and skin separately and fixing them together, it is known to co-inject materials comprising the stringer and the skin (e.g., using vacuum assisted resin transfer molding (VARTM)) to form one continuous fabric preform (without adhesive bonding) and co-cure the stringer and the skin together. Exemplary materials for forming a composite skin-stringer may include plain weave carbon fabric and SC-15 epoxy resin.

U.S. Pat. No. 10,023,321 to Oyzerskiy notes that aircraft having wings that incorporate fuel tanks and hollow stringers may require the stringers to be internally sealed. Oyzerskiy further notes that prior art fuel dams are heavy, and are inserted through large openings in the walls of the stringers and fixed in place using fasteners installed through the stringers. Oyzerskiy proposes an improved method for sealing a stringer that requires a lightweight, flowable sealant to be injected through a hole in a wall of a stringer until it fills a portion of the hollow and "conforms to the interior wall" in the shape of the stringer for curing. The flowable sealant is retained, during the curing process, between "spaced apart walls" such as inflatable membranes that are removed through holes in the walls of the stringer after curing.

SUMMARY OF THE INVENTION

Embodiments of the present invention expand the potential utility and longevity of vehicle stringers. For instance, a plug according to an embodiment of the present invention may transform a composite skin-stringer of an aircraft into a series of fluidly isolated and/or controlled passages for effectively transporting fuel, air or other substances. Further, the plug may provide improved sealing over longer periods of time, particularly in embodiments utilizing a plug of a similar coefficient of thermal expansion to that of the stringer. Still further, the improved plug and stringer may be assembled using methods that do not require drilling holes through the stringer for placement of the plug and resultant loss of structural integrity of the stringer.

One embodiment of the invention is a method for co-bonding a plug and a stringer on a surface of a part. The method includes providing a first mandrel having a first end and a length extending along an axis, and providing a second mandrel having a second end and a length extending along the axis. The method also includes providing a plug having opposite first and second axial end faces. The first end of the first mandrel is joined with the first axial end face of the plug, and the second end of the second mandrel is joined with the second axial end face of the plug. The assembled plug and respective adjacent portions of the first end and the second end together define a pre-cure plug form. A stringer ply is laid over the pre-cure plug form and the remainder of each of the first end and the second end, and the stringer ply is cured to create a stringer bisected by the plug.

Another embodiment of the invention is a plugged stringer-forming assembly on a surface of a part. The assembly includes a first mandrel having a first end and a length extending along an axis, and a second mandrel having a second end and a length extending along the axis. The assembly also includes a stringer ply and a plug having opposite first and second axial end faces. The first end of the first mandrel is joined with the first axial end face of the plug, and the second end of the second mandrel is joined with the second axial end face of the plug. The assembled plug and respective adjacent portions of the first end and the second end together define a plug form. The stringer ply covers the plug form and the remainder of each of the first end and the second end to form a stringer bisected by the plug.

Yet another embodiment of the invention is a plugged stringer on a surface of a part. The plugged stringer includes a plug having opposite first and second axial end faces and a radially outer margin defined by a radially outer bottom face, radially outer first and second opposite side faces, and a radially outer top face. The plugged stringer also includes a covering overlaying the radially outer top face and the first and second opposite side faces of the plug and extending away from the plug along an axis to form a stringer having first and second segments delineated by the plug. The radially outer margin of the plug is at least partly covered by an adhesive, the radially outer bottom face being adhered to the surface of the part and the covering being adhered to the radially outer first and second opposite side faces and the radially outer top face. The first and second segments respectively define first and second fluid passages separated by the plug, with the first fluid passage being fluidly isolated from the second fluid passage by the plug. The covering exhibits a coefficient of thermal expansion within five percent (5%) of a coefficient of thermal expansion exhibited by the plug.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
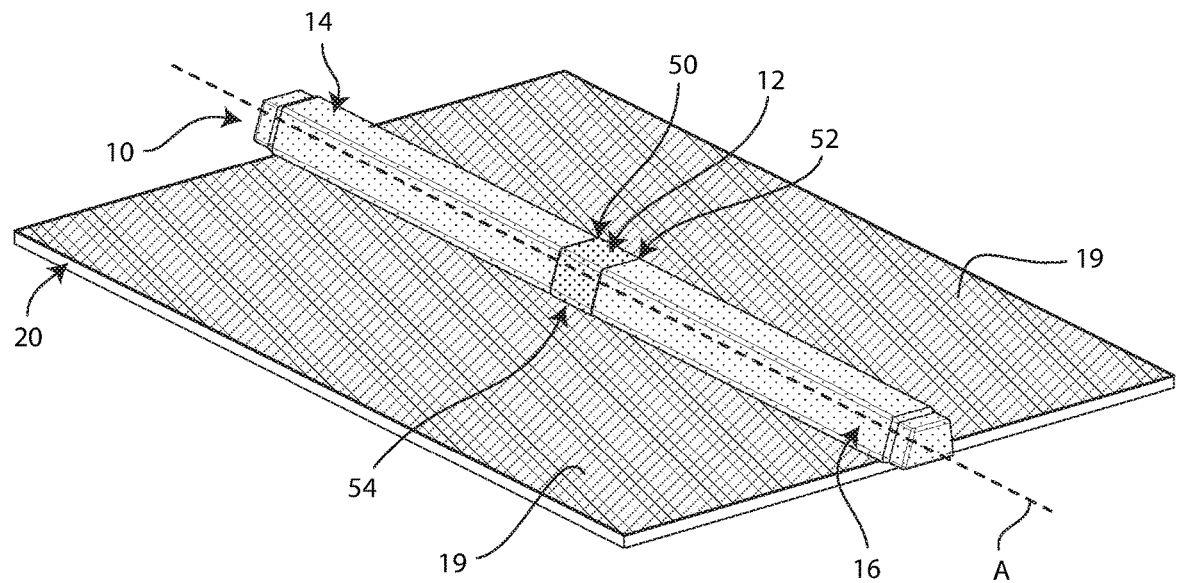
FIG. 1 is a perspective view of a plugged-stringer-forming assembly constructed according to embodiments of the present invention, the assembly being bereft of any stringer ply and positioned on a surface of a part.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
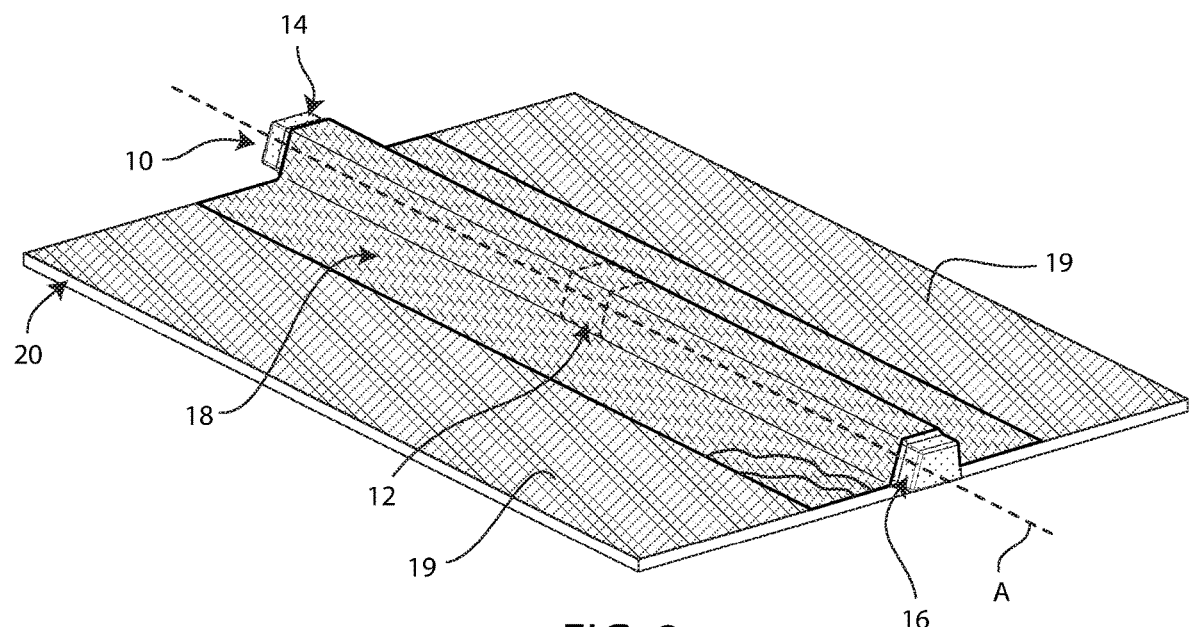
FIG. 2 is a perspective view of the assembly of FIG. 1, illustrating one complete and two partial overlying stringer plies of the assembly.
Figure 3:
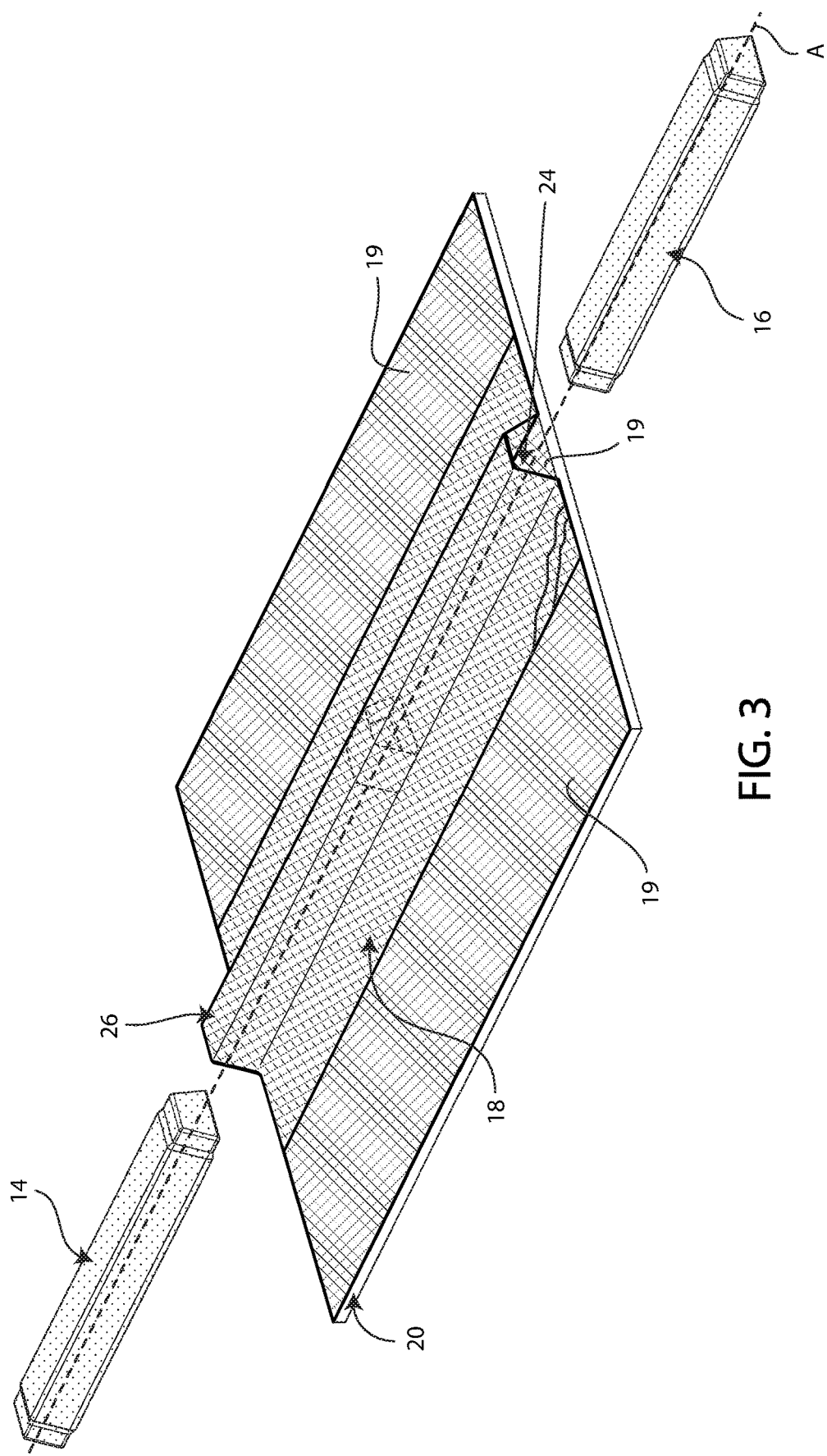
FIG. 3 is an exploded perspective view of the assembly of FIG. 2 illustrating removal of mandrels of the assembly and a second passage formed by a stringer.
Figure 4:
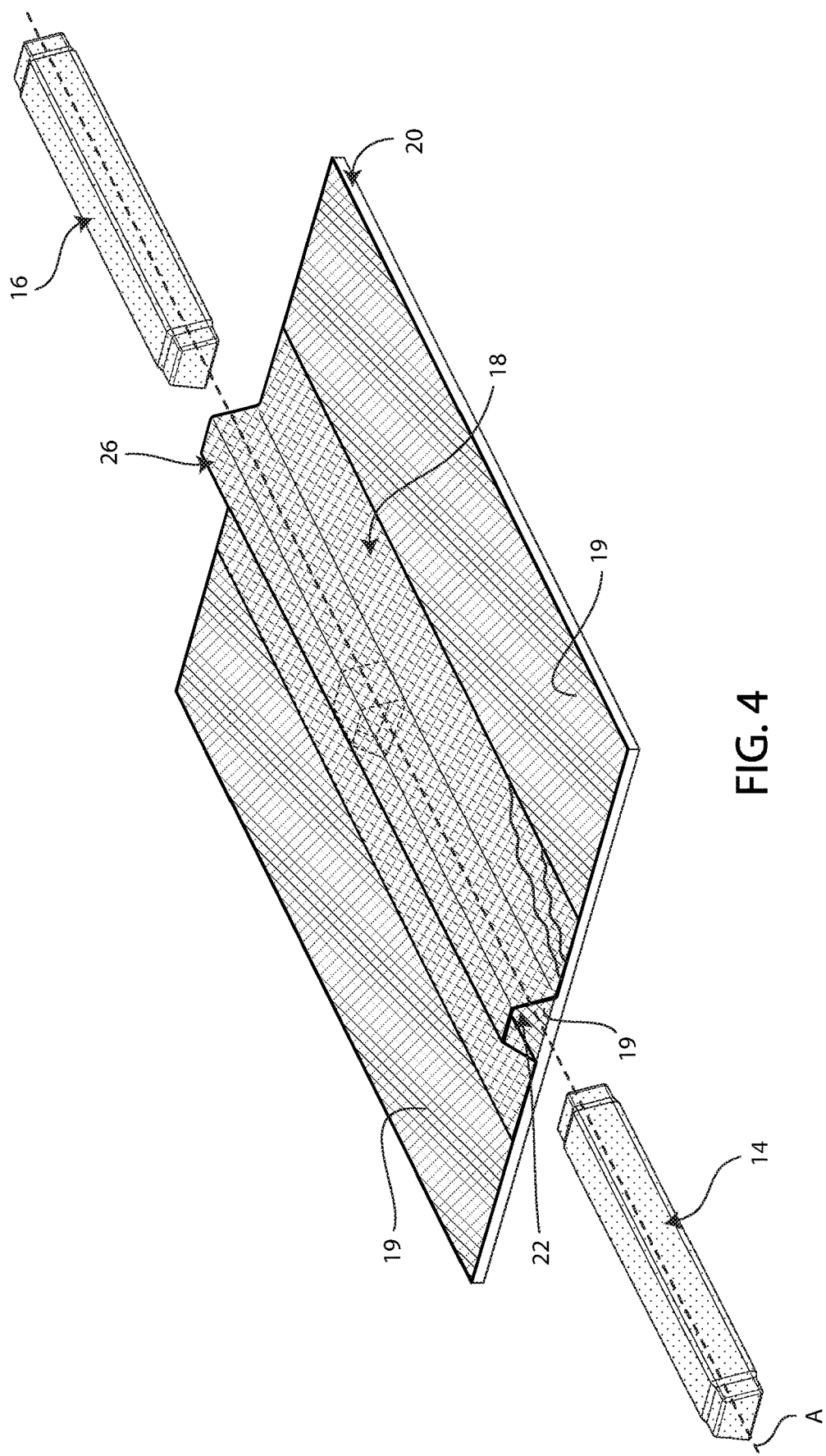
FIG. 4 is an exploded perspective view of the assembly taken from an opposite angle from FIG. 3 to show a first passage formed by the stringer.

A plugged stringer-forming assembly 10 constructed in accordance with embodiments of the present invention is illustrated in FIGS. 1-4. The assembly 10 includes a plug 12, first and second mandrels 14, 16, and stringer plies 18 covering the plug 12 and at least a portion of each of the mandrels 14, 16. In FIGS. 1-2, the assembly 10 is disposed on a surface 19 of a part 20. The stringer plies 18 extend over and along the sides of the mandrels 14, 16 and plug 12, overlapping portions of the surface 19.

The part 20 may comprise an aircraft wing, a segment of a fuselage, or other areas of an aircraft without departing from the spirit of the present invention. It is foreseen that parts may be of other types of vehicles—such as boats—without departing from the spirit of the present invention.

Figure 11:
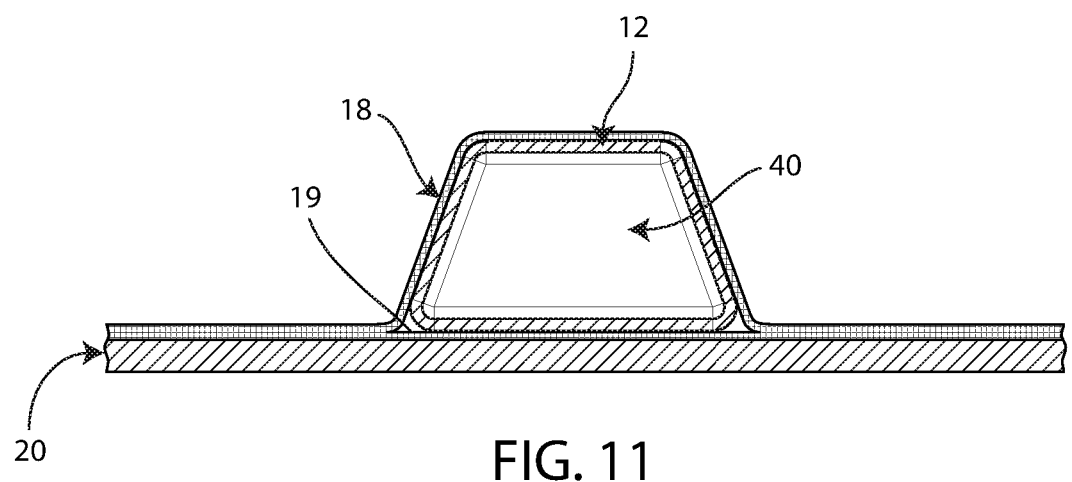
FIG. 11 is a partially sectioned view of the assembly of FIG. 3 taken along an axis A, the view excluding the mandrels to better illustrate an axial end face of the plug through the second passage of the stringer.

In an embodiment, the surface 19 is presented by a ply of the material that comprises the stringer plies 18. For example, the surface 19 may be presented by a "skin" of the part 20, as seen in FIG. 11. It is foreseen that plies forming skin of a part may constitute the entire thickness of the part, or may constitute one or more outer layer(s) of the part (e.g., as shown in FIG. 11), without departing from the spirit of the present invention. One of ordinary skill will also appreciate that a stringer may be formed of more or fewer plies within the scope of the present invention.

One or more of the stringer plies 18 may be fixed to portions of the plug 12 by adhesives and/or fasteners. For example, in the preferred embodiment, the plug 12 is at least partly covered by adhesive, as explained in more detail below, for adherence to at least the abutting one of the stringer plies 18.

The stringer plies 18 may define first and second passages 22, 24 respectively on opposite sides of the plug 12 along an axis A. The portions of the stringer plies 18 that define the first and second passages 22, 24 and that cover the plug 12 may together form a stringer 26. (See FIGS. 3-4)

In an embodiment, surfaces of the plug 12 that are adhered to one or more of the stringer plies 18 and to the surface 19 together form a seal fluidly isolating the first passage 22 from the second passage 24. It is foreseen, however, that a plug may incorporate an orifice and/or valve or the like for selectively or continuously restricting fluid flow between passages of a stringer on either side of the plug without departing from the spirit of the present invention.

Figure 5:
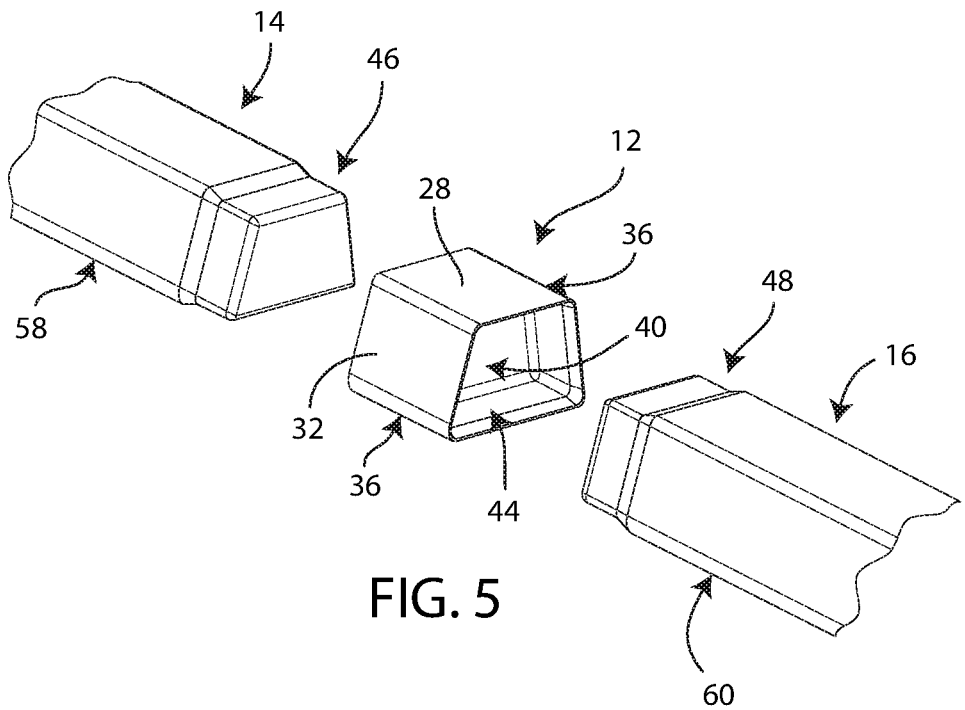
FIG. 5 is a partially sectioned, exploded detail view of the assembly of FIG. 1, illustrating details of the assembly without adhesive and/or nonstick coatings.
Figure 6:
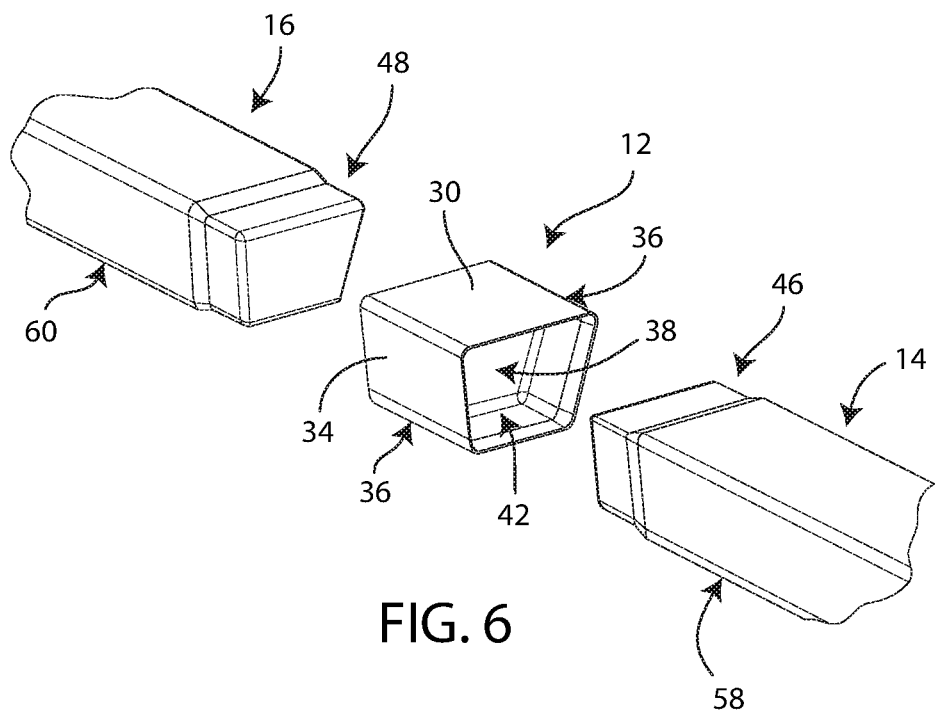
FIG. 6 is a partially sectioned, exploded detail view of the assembly taken from an opposite angle from FIG. 5 to show bottom surfaces of the plug and mandrels.

Turning to FIGS. 5-6, the plug 12 includes a radially outer top face 28, a radially outer bottom face 30, and radially outer opposite side faces 32, 34. Together, the faces 28, 30, 32, 34 define a radially outer margin 36 of the plug 12. The plug 12 has a trapezoidal cross-sectional shape (see FIG. 11) corresponding to a HAT-type stringer. However, it is foreseen that other cross-sectional shapes of a plug and/or stringer may be utilized without departing from the spirit of the present invention. For example, a continuous "top face" lacking opposite side faces delineated by edges is within the scope of the present invention. Preferably, the cross-sectional shape of a co-bonded plug and stringer are substantially the same.

The plug 12 also includes first and second axial end faces 38, 40. The first and second axial end faces 38, 40 respectively form sockets 42, 44. The sockets 42, 44 are respectively formed to be keyed to the first and second mandrels 14, 16. More particularly, as illustrated in FIGS. 5-6, the first mandrel 14 includes a tapered first end 46 and the second mandrel 16 includes a tapered second end 48. Each of the tapered first end 46 and the tapered second end 48 is shaped to complement and is keyed to the corresponding socket 42, 44. The preferred ends 46, 48 taper into trapezoidal cubes with rounded edges and broad, flat axial end faces. The sockets 42, 44 are complementarily-shaped to respectively receive and sit flush against the surfaces of the ends 46, 48.

One of ordinary skill will appreciate that mandrel ends may be variously shaped for mating with and support of plug sockets within the scope of the present invention. One of ordinary skill will also appreciate that one or both mandrels and/or a portion of one or both mandrels may play a female role in the joining—for example by forming all or part of a socket into which a corresponding axial end face of a plug may fit—within the scope of the present invention, with corresponding portion(s) of the axial end face of the plug accordingly being converted to a male role and complementary shape. It is also foreseen that an interface between an axial end face of a plug and a corresponding end of a mandrel may not be of substantially continuous engagement—such as where the axial end face and the end of the mandrel are not in continuous circumferential contact—without departing from the spirit of the present invention.

Figure 7:
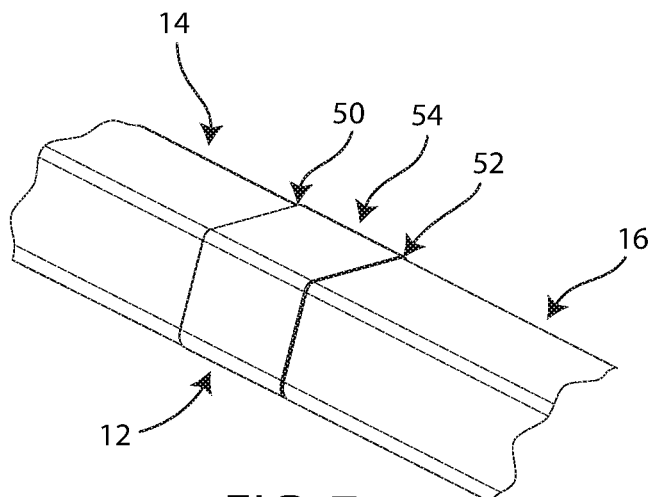
FIG. 7 is a partially sectioned detail view of the assembly of FIG. 1, illustrating details of the assembly without adhesive and/or nonstick coatings.
Figure 8:
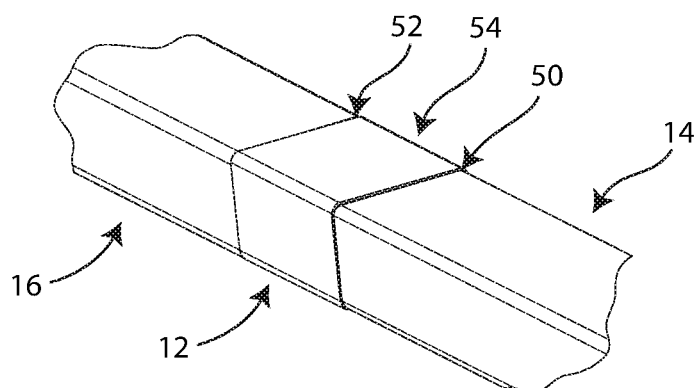
FIG. 8 is a partially sectioned detail view of the assembly taken from an opposite angle from FIG. 7 to show bottom surfaces of the plug and mandrels.
Figure 9:
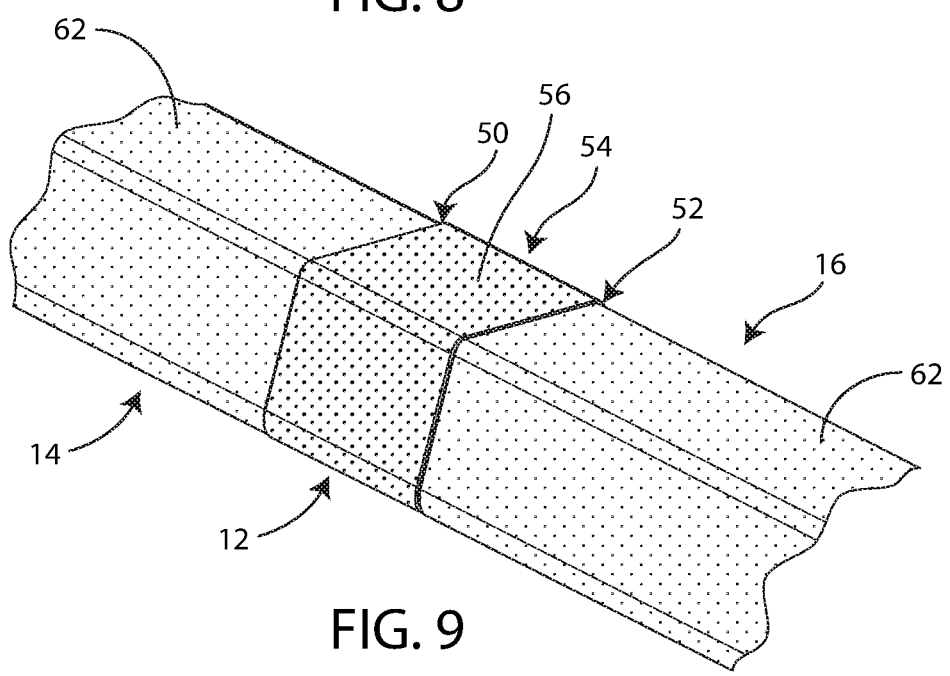
FIG. 9 is a partially sectioned detail view of the assembly of FIG. 1 showing adhesive and nonstick coatings.

Turning to FIGS. 7-9, the plug 12 also includes axially opposite end margins 50, 52. Between the end margins 50, 52, radially outer surfaces of the mated plug 12 and/or mandrels 14, 16 present a plug form 54. In the illustrated embodiment, the plug form 54 corresponds to the radially outer margin 36 of the plug 12, because the plug 12 comprises female axially opposite end faces 38, 40 and therefore defines the radially outermost surfaces of the assembly 10 between the end margins 50, 52. However, where, for example, a plug comprises an axial end face having at least one male portion, a plug form may be at least partly defined by a radially outer surface of a corresponding end of a mandrel, with the end of the mandrel fitting over the end face of the plug. In this manner, the plug form 54 may be considerable as the radially outer profile of the assembly 10 between the axially opposite end margins 50, 52 before curing processes have begun (see discussion below).

As discussed in more detail below, the mating portions of the plug 12 and ends 46, 48 preferably support the plug form 54 against deformation during curing processes, which may involve heat and/or the application of pressure. The mandrels 14, 16 may comprise an elastomeric material such as ethylene propylene diene monomers (EPDM) or another high-density elastomer capable of withstanding increased temperature and/or the application of positive/negative pressures, without substantial deformation. The mandrels 14, 16 may also be solid—i.e., without significant internal cavities—to provide support against deformation. Thus, the stringer 26 may be formed on the mandrels 14, 16 and plug form 54 without substantial deformation.

The mandrels 14, 16 may extend axially away on either side of the plug 12, maintaining a cross-sectional shape and size substantially the same as that of the radially outer margin 36 of the plug 12. The radially outer margin 36 of the plug 12 may be sanded and, as noted above, coated in an adhesive 56 (e.g., a film adhesive) for co-bonding with the stringer plies 18. (See FIG. 9) In addition, radially outer margins 58, 60 of the mandrels 14, 16 (See FIGS. 5-6) may be coated in a nonstick compound or coating 62 (e.g., fluorinated ethylene propylene (FEP) or another fluoropolymer) (see FIG. 9).

One of ordinary skill will appreciate that a variety of coatings may promote co-bonding between a plug and stringer ply—depending at least in part on the materials and preparatory/bonding methods utilized for the plug and stringer ply—within the scope of the present invention. Moreover, it is foreseen that various nonstick compounds and coatings, or no coating at all, may be utilized to ensure removability of mandrels without departing from the spirit of the present invention.

The stringer plies 18 may comprise pre-impregnated carbon fiber reinforced polymer (CFRP) fabric or tape. One of ordinary skill will appreciate, however, that stringers comprising other covering material such as carbon fiber plies, aluminum, other composites or alloys including aluminum and one or more of zinc, magnesium and copper are also within the scope of the present invention. In an embodiment the stringer may comprise material other than that used to form skin of the vehicle, the stringer material being bonded to the skin or surface of the part via co-curing, fasteners and/or adhesives, without departing from the spirit of the present invention.

The plug 12 may comprise a material having a substantially similar coefficient of thermal expansion (CTE) as the stringer plies 18 and/or plies presenting the surface 19. Preferably, the CTE of the plug 12 is within five percent (5%) of the CTE of the stringer plies 18 (i.e., using the International System of Units (SI) unit of inverse Kelvin ($K^{-1}$)), inclusive. More preferably, the CTE of the plug is within one-half of one percent (0.5%) of the CTE of the stringer plies 18, inclusive. Still more preferably, the plug 12 comprises the same materials as the stringer plies 18, exhibiting the same CTE. In the present example, the plug 12 may comprise CFRP. Where an aircraft bearing the part 20 with co-bonded stringer 26 undergoes significant changes in temperature, the plug 12 preferably maintains a seal against the stringer plies 18 and against the surface 19 of the part 20 without damaging any corresponding sealant (e.g., adhesive) forming the seal. That is, the similar CTE of the plug 12, the stringer plies 18 and/or the material(s) presenting the surface 19 should provide for commensurate expansion/retraction between the plug 12, the stringer plies 18 and the surface 19 to reduce damage to the seal therebetween during expansion/retraction.

A plugged stringer may include additional, less or alternate functionality and/or components. For example, a plugged stringer may be formed by inserting a plug into an already-formed and hardened stringer and fixing the plug into place along the interior of the stringer (e.g., using adhesive or the like) without departing from the spirit of the present invention.

Nonetheless, the preferred embodiment of the present invention comprises stringer ply co-bonded over a matched-CTE plug to form a composite skin-stringer. The preferred embodiment may provide reduced weight, better sealing across various temperature ranges, fewer/simpler preparatory steps to form a seal between stringer and plug and retention of structural integrity of the stringer, greater flexibility for application (i.e., along the length of a stringer) of the plug, and/or greater conformance to manufacturing tolerances as compared with one or more of the other options presented herein.

Figure 12:
FIG. 12 is a flow chart illustrating a method for co-bonding a plug and a stringer on a surface of a part in accordance with embodiments of the present invention.

Method steps for co-bonding a plug and a stringer on a surface of a part will now be described in more detail, in accordance with various embodiments of the present invention. The steps of the method 100 may be performed in the order as shown in FIG. 12, or they may be performed in a different order. Furthermore, some steps may be performed concurrently as opposed to sequentially. In addition, some steps may not be performed.

As illustrated in FIG. 12, the method 100 for co-bonding a plug and a stringer on a surface of a part may include sanding a radially outer margin of the plug, as depicted in block 101. One of ordinary skill will appreciate that additional preparatory steps may be taken to prepare the plug—for example manufacturing the plug using a bulk molding compound and closed mold tooling—within the scope of the present invention.

The method 100 may also include the step of applying a nonstick coating to at least a portion of a radially outer margin of each of the mandrels, as depicted in block 102. One of ordinary skill will appreciate that preparatory steps 101, 102 may be optional in certain embodiments, for example where the degree of anticipated adhesion between the mandrels and aircraft skin does not require reducing friction therebetween. It is also foreseen that other preparatory steps may be included without departing from the spirit of the present invention.

The method 100 may also include coating the plug in a film adhesive, as depicted in block 103. For example, the film adhesive may include a peel ply applied to the radially outer margin of the plug to promote adhesion to a surface of a part (along a radially outer bottom face of the plug) and co-bonding with stringer ply along other portions of the margin during a curing process (discussed in more detail below). One of ordinary skill will appreciate that a variety of adhesives or other co-bonding substances may be applied to the radially outer margin of the plug to enhance sealing between the plug and stringer ply and the between the plug and the surface of the part within the scope of the present invention.

Figure 10:
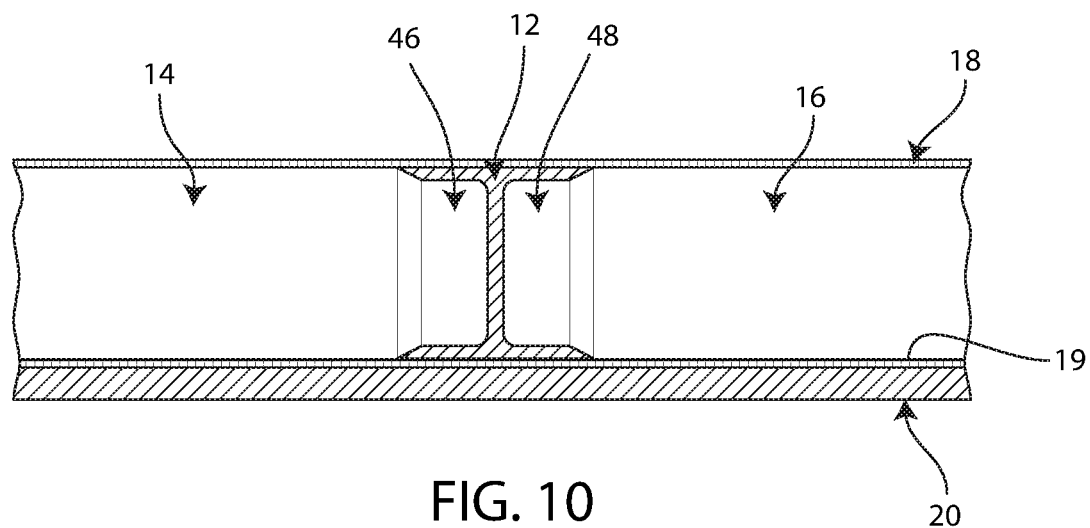
FIG. 10 is a partially sectioned side view of the assembly of FIG. 7, with a radially outer opposite side face of the plug and corresponding portions of overlying stringer plies being removed to show a mated relationship between the plug and mandrel ends.

The method 100 may also include joining an end of each of the mandrels with a corresponding axial end face of the plug to define a pre-cure plug form, as depicted in block 104. As noted in the examples provided above, the ends of the mandrels are preferably formed to be keyed to corresponding structures of the axial end faces of the plug, for example in a male-female relationship. In the preferred embodiment, each end of a mandrel tapers into the shape of a trapezoidal cube presenting a radially outer margin sized to fit snugly within a correspondingly shaped axial end face of the plug, the axial end face presenting a socket with an inner surface that engages the radially outer margin of the end of the mandrel to receive support against deformation. (See FIG. 10) Also in the preferred embodiment, rounded edges of the trapezoidal cube of the end of each mandrel (see FIGS. 5-6) help guide the process of pressing the mandrel into the socket of the plug.

In this manner, respective ends of the mandrels support corresponding sockets of the plug to maintain the shape of the pre-cure plug form during a curing process (outlined below). One of ordinary skill will appreciate that various mating structures may be utilized providing varying degrees of support against deformation of the pre-cure plug form—for example, in view of varying assembly/curing processes and/or manufacturing tolerances—within the scope of the present invention.

In an embodiment, mandrels and a plug may be measured prior to assembly for conformance with respective manufacturing tolerance(s). Measurement against such tolerance(s) may ensure a proper fit therebetween and a resultant assembled pre-cure plug form that will support co-bonding with stringer ply to form a stringer meeting structural design requirements for the part in question. Moreover, the pre-cure plug form may be measured along one or more dimensions for comparison against corresponding measurements along those dimension(s) taken after curing (described below) is completed. Preferably, the percentage of deformation—e.g., reduction in the dimension(s) due to application of pressure during curing—is less than five percent (5%), due at least in part to the supporting/matting relationship between the mandrels and the plug. More preferably, the percentage of deformation is less than two percent (2%). Still more preferably, all dimensions of the plug form are within the deformation percentages outlined above.

The method 100 may also include positioning the assembled pre-cure plug form and mandrels along the surface of the part, as depicted in block 105 (and shown in FIG. 1). For instance, the part may comprise a portion of a wing of an aircraft, and the surface may be an interior surface along which a stringer is to be constructed to strengthen skin of the aircraft (discussed below) against buckling under compression or shear loads. In many applications, a longitudinal axis of the assembled plug form and mandrels is substantially aligned with a longitudinal dimension of the part (e.g., a length of the wing). Additional pre-cure steps may also be performed—such as applying prepreg unidirectional tape along sides of the plug form and mandrels—within the scope of the present invention.

The method 100 may also include laying at least one stringer ply over the assembled pre-cure plug form and portions of the mandrels, as depicted in block 106 (and as shown in FIG. 2). In the preferred embodiment, CFRP plies are laid up against exposed portions of radially outer margins of the plug and the mandrels. Additional CFRP plies forming aircraft skin preferably present the surface of the part on which the plug form rests, such that the laid up stringer plies extend over the pre-cure plug form and away from the edges of the pre-cure plug form onto the surface of the aircraft skin in an overlapping fashion (see FIG. 11). It is also foreseen that stringer plies may comprise one or more plies also forming layers of aircraft skin around the pre-cure plug form—such as where the skin splits over the plug and mandrels to form a composite skin-stringer by co-curing—without departing from the spirit of the present invention. One of ordinary skill will appreciate that vehicle skin comprising other materials is also within the scope of the present invention.

The method 100 may further include curing the stringer ply(ies) to create a stringer bisected by the plug, as depicted in block 107. For instance, a co-cured composite skin-stringer may be cured using VARTM. That is, resin may be flowed into skin that is contained within a mold tool covered by a vacuum bag (not shown). After impregnation of the skin with the resin, the part and stringer may be allowed to cure (e.g., at room temperature or at another temperature). For another example, pre-impregnated CFRP stringer ply may be cured over the pre-cure plug form through application of heat by an autoclave or oven and of pressure by an autoclave, vacuum bag or closed mold tooling. The positive pressure presses the stringer ply against the pre-cure plug form for airtight bonding. The stringer may be co-bonded to the part. It is foreseen that a variety of curing procedures may be utilized to co-bond and/or co-cure the composite skin-stringer without departing from the spirit of the present invention.

One of ordinary skill will also appreciate that curing may be excluded in embodiments where the stringer comprises aluminum or other materials not requiring curing, and that a plugged stringer may be fixed to a surface of a part using adhesives and/or fasteners without departing from the spirit of the present invention.

The method 100 may also include removing the mandrels from the plug, the stringer having been formed with first and second passages on either side of the plug, as depicted in block 108. The plug may fluidly isolate the first and second passages and/or may be configured with an orifice, valve or the like for restricting and/or controlling the flow of fluid between the first and second passages.

The method may include additional, less, or alternate actions, including those discussed elsewhere herein. For instance, the method may include filling a space at least partly defined by the part and the stringer with fuel, the fuel filling the first passage but being restricted from flowing into the second passage by the plug.

The plugged stringer and the assembly and methods for formation thereof described herein advantageously expand the potential utility and longevity of vehicle stringers. For instance, a plug according to an embodiment of the present invention may transform a composite skin-stringer of an aircraft into a plurality of fluidly isolated and/or controlled passages for effectively transporting fuel, air or other substances. As the interior volume of vehicle compartments and the overall weight of a vehicle are critical design considerations, maximizing available volume and/or optimizing fluid flow designs without the need for expanding frame size(s), adding additional piping or the like is a significant boon to vehicle manufacturers and operators. Further, the plug may provide improved sealing over longer periods of time, particularly in embodiments utilizing a plug of a similar coefficient of thermal expansion to that of the stringer. Still further, the improved plug and stringer may be assembled using methods that do not require drilling holes through the stringer for placement of the plug and resultant loss of structural integrity of the stringer.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for co-bonding a plug and a stringer on a surface of a part, the method comprising:
   providing a first mandrel having a first end and a length extending along an axis;
   providing a second mandrel having a second end and a length extending along the axis;
   providing a plug having opposite first and second axial end faces;
   joining the first end of the first mandrel with the first axial end face of the plug;
   joining the second end of the second mandrel with the second axial end face of the plug, the assembled plug and respective adjacent portions of the first end and the second end together defining a pre-cure plug form;
   positioning the first mandrel, the second mandrel and the plug along the surface of the part in substantial alignment with a dimension of the part;
   laying a stringer ply over the pre-cure plug form and the remainder of each of the first end and the second end, with the laid stringer ply overlapping the surface of the part; and
   curing the stringer ply to create a stringer bisected by the plug.

2. The method of claim 1, wherein—
   the first end of the first mandrel and the first axial end face of the plug comprise complementary shapes that are keyed together to join the first end of the first mandrel with the first axial end face of the plug,
   the second end of the second mandrel and the second axial end face of the plug comprise complementary shapes that are keyed together to join the second end of the second mandrel with the second axial end face of the plug.

3. The method of claim 2, wherein the first end of the first mandrel and the second end of the second mandrel are tapered, and the opposite axial end faces of the plug each form a respective complementarily-shaped socket.

4. The method of claim 3, wherein the curing includes applying vacuum pressure to the stringer ply, the respective tapered ends of the mandrels substantially supporting the respective sockets of the plug to maintain a shape of the pre-cure plug form throughout the curing within a manufacturing tolerance.

5. The method of claim 1, wherein, after the curing, the stringer ply exhibits a coefficient of thermal expansion within five percent (5%) of a coefficient of thermal expansion exhibited by the plug.

6. The method of claim 5, wherein the stringer ply and the plug each comprise carbon fiber material.

7. The method of claim 6, wherein the first and second mandrels each comprise an elastomeric material.

8. The method of claim 1, wherein the stringer and the plug each have a cross-sectional shape of a HAT stringer.

9. The method of claim 1, further comprising removing the first mandrel and the second mandrel from the stringer.

10. The method of claim 1, wherein—
   each of the first mandrel, the second mandrel and the plug has a radially outer margin,
   the radially outer margin of each of the first mandrel and the second mandrel is at least partly covered by a nonstick coating,
   the radially outer margin of the plug is at least partly covered by an adhesive.

* * * * *